United States Patent
Buettner

(10) Patent No.: US 9,989,086 B2
(45) Date of Patent: Jun. 5, 2018

(54) SLIDING BEARING

(71) Applicant: Martin Buettner, Schwarzach (DE)

(72) Inventor: Martin Buettner, Schwarzach (DE)

(73) Assignee: AKTIEBOLAGET SKF, Gothenburg (SE)

( * ) Notice: Subject to any disclaimer, the term of this patent is extended or adjusted under 35 U.S.C. 154(b) by 0 days. days.

(21) Appl. No.: 15/189,364

(22) Filed: Jun. 22, 2016

(65) Prior Publication Data
US 2016/0377115 A1 Dec. 29, 2016

(30) Foreign Application Priority Data
Jun. 24, 2015 (DE) .................. 10 2015 211 739

(51) Int. Cl.
*F16C 17/10* (2006.01)
*F16C 27/02* (2006.01)
*F16C 33/18* (2006.01)
*F16C 33/04* (2006.01)
*F16C 33/20* (2006.01)
(Continued)

(52) U.S. Cl.
CPC .............. *F16C 17/10* (2013.01); *F16C 27/02* (2013.01); *F16C 33/04* (2013.01); *F16C 33/046* (2013.01); *F16C 33/18* (2013.01); *F16C 33/20* (2013.01); *F16C 33/205* (2013.01); *B33Y 80/00* (2014.12); *F16C 33/74* (2013.01); *F16C 2220/24* (2013.01); *F16C 2223/30* (2013.01); *F16C 2240/70* (2013.01)

(58) Field of Classification Search
CPC .......... F16C 17/10; F16C 23/43; F16C 27/02; F16C 33/04; F16C 33/046; F16C 33/18; F16C 2223/30; F16C 2240/70
See application file for complete search history.

(56) References Cited

U.S. PATENT DOCUMENTS

| | | | | |
|---|---|---|---|---|
| 2,842,945 A | * | 7/1958 | Swanson | ................ F16D 3/185 384/202 |
| 3,709,573 A | * | 1/1973 | Orkin | ...................... F16C 33/10 384/264 |

(Continued)

FOREIGN PATENT DOCUMENTS

| | | | |
|---|---|---|---|
| DE | 840939 | * | 6/1950 |
| FR | 2266820 | * | 10/1975 |

*Primary Examiner* — James Pilkington
(74) *Attorney, Agent, or Firm* — Bryan Peckjian; SKF USA Inc, Patent Dept.

(57) ABSTRACT

A sliding bearing includes at least one bearing inner ring and at least one bearing outer ring configured to rotate relative to each other about an axis (a), where the rings each include at least one sliding surface, the sliding surfaces being configured to slide along each other, and where the contact surface formed by the mutually contacting sliding surfaces has a maximum contact diameter ($D_K$). At least parts of the sliding surfaces in a radial section have a radius of curvature ($r_B$), the radius of curvature ($r_B$) has a centerpoint (M) located at an offset (b) from the axis (a), and the offset (b) is at least 5% of the radius of curvature ($r_B$).

7 Claims, 6 Drawing Sheets

(51) Int. Cl.
*B33Y 80/00* (2015.01)
*F16C 33/74* (2006.01)

(56) References Cited

U.S. PATENT DOCUMENTS

| | | | | |
|---|---|---|---|---|
| 3,849,010 A | * | 11/1974 | Herbenar | F16C 11/0638 403/138 |
| 4,116,504 A | * | 9/1978 | Cass | F16C 11/0614 384/210 |
| 5,054,940 A | * | 10/1991 | Momose | C04B 35/111 384/192 |
| 2014/0016888 A1 | * | 1/2014 | Harper | F16C 33/74 384/147 |

\* cited by examiner

SLIDING BEARING

CROSS-REFERENCE

This application claims priority to German patent application no. 10 2015 211 739.1 filed on Jun. 24, 2015, the contents of which are fully incorporated herein by reference.

TECHNOLOGICAL FIELD

The disclosure is directed to a sliding bearing comprising at least one bearing inner ring and at least one bearing outer ring that can rotate relative to each other about an axis, wherein the at least one bearing inner ring and the at least one bearing outer ring each include at least one sliding surface.

BACKGROUND

Sliding bearings of the above-mentioned type are known in the art. They can be configured as radial and/or axial bearings. Radial, angular-contact, and axial-plain bearings are already known.

In the case of a radial bearing the sliding surfaces are spherical and are arc-shaped in radial section. In these bearings, the centerpoint of the circular path lies on the rotational axis of the bearing. In this case both radial and axial support is provided; furthermore tilting movement of the rotational axis is also possible.

Sliding bushings having cylindrical bushing geometry are also known. In this case only radial loads can be supported because the cylindrical bushing can slide axially in its counter-contour and thus transmits no axial forces.

Thrust washers serve exclusively for transmitting axial forces and also work on the principle of a sliding bearing.

SUMMARY

An aspect of the present disclosure is to confer an increased functionality to a sliding bearing of the above-described type so that a transmission of both radial and axial forces is possible while maintaining a long service life.

These benefits are obtained by configuring the bearing such that the radius of curvature has a centerpoint that lies at an offset from the axis, the offset being at least 5% of the radius of curvature.

In particular in a radial-bearing embodiment (see below, in particular in FIG. 1) and in a pivot-bearing embodiment (see below, in particular in FIG. 2) the centerpoint of the radius of curvature is preferably disposed very clearly with an offset from the axis. Therefore the offset is preferably at least 50% of the radius of curvature.

However, in an axial-bearing embodiment (see below, in particular in FIG. 5) a lower value is usually provided for the offset; however this also always lies at a value greater than 5% of the radius of curvature.

The radius of curvature is a radius in the actual sense and less than infinite, and thus defines a torus-surface or barrel-surface of the sliding surfaces, i.e., not a cylindrical sliding surface (sleeve) or flat sliding surface (thrust washer).

It is preferred that the radius of curvature is at least 150% of the maximum contact diameter or at most 40% of the maximum contact diameter.

According to a preferred design the radius of curvature is between 150% and 600%, preferably between 200% and 400%, of the maximum contact diameter. Thus the radius of curvature of the sliding surface in radial section is significantly larger than the distance between the axis of the sliding bearing and the sliding surface. Therefore, the sliding surfaces have a very large profile radius in comparison to the bearing radius so that the sliding surface results in a barrel-like surface section. The profile-radius centerpoint thus lies at a large radial distance from the bearing axis.

To further clarify, the "contact diameter" as used herein is the maximum diameter at which the sliding surfaces contact each other if there is no pivoting between the bearing outer ring and the bearing inner ring; that is, when the axes of the inner and outer bearings are parallel to each other.

In another configuration, the radius of curvature is between 5% and 15% of the maximum contact diameter. In this case the radius of curvature of the sliding surface is significantly smaller in radial section than the distance between the axis of the sliding bearing and the sliding surface. In this case the sliding surfaces have a profile radius that is very much smaller than the bearing radius.

To influence the bearing clearance or play the radius of curvature for the inner ring and that of the outer ring may be made different instead of identical as preferred. This may allow bearing clearance or play to be selectively adjusted.

Accordingly for clearance adjustment the offset (centerpoint M to axis a) for the inner ring and the outer ring may not be identical, as preferred, but rather it may be slightly different.

One of the bearing rings can also be formed by a rotating machine part, in particular by a shaft. In a similar manner one of the bearing rings can be formed by a stationary machine part, in particular by a housing.

It is preferably provided that the sliding surfaces or even the entire bearing rings are comprised of metal or at least include a metal surface. These can optionally be lubricated with lubricant (e.g., grease, oil, dry lubricant).

In a preferred further development of the disclosure at least the sliding surface of one of the bearing rings is formed by an elastic material. Here a fiber-reinforced fabric material, plastic, or also a metal-plastic composite material may be used. The elastic material can also be formed by a coating that is applied to the bearing ring. Sliding combinations of metal/metal with grease or oil lubrication are also conceivable.

The at least one bearing inner ring and/or the at least one bearing outer ring can—for installation-related reasons—be configured as at least two parts (or divided on one side). The parts of the bearing ring can thereby be manufactured by breaking the bearing ring. Other division methods are possible, for example, eroding (electrical discharge machining)

At least one of the bearing rings can also be manufactured by a generative production method, in particular by 3-D printing.

A further embodiment includes two sliding bearing regions with common bearing rings that are disposed axially adjacent to each other. In particular bearing combinations are realizable face-to-face and back-to-back from individual bearing rings or with common (connected) bearing rings in an analogous manner as with plain bearings.

The disclosure thus provides a sliding bearing in which sliding surfaces are formed by surface sections of a torus. In the field of rolling-element bearings a related design is known in the so-called toroidal bearings.

The torus-profile radius deviates greatly from the bearing radius, i.e., from the distance between the bearing rotational axis and the sliding surface.

Advantageously, depending on bearing clearance and the elasticity of the components used, a slight degree of tilting is allowed, which is, however, significantly limited depending on the design. Thus the transmission of tilting moments is also possible to a certain extent.

Thus to a certain extent the disclosed design combines in a sliding bearing the advantages of spherical plain bearings and those of sliding-bearing bushings. The disclosed sliding bearing has a limited tilting movability that is dependent on the bearing clearance and the elasticity of the components used. This can be used in particular for compensation of shaft misalignments or of shaft deflections.

Furthermore, the disclosed sliding bearing has a limited axial displaceability, which in turn is dependent on the bearing clearance and the elasticity of the components used.

The tilting and axial movability is thus present in a somewhat similar manner as is the case in toroidal bearings in the rolling-element bearing field.

A geometric design of the sliding surfaces in the manner described achieves low contact and edge stresses. Microscopic elastic component deformations under bearing load supports this behavior. It is particularly advantageous if elastic sliding surfaces are used in the proposed sliding bearing. Such sliding surfaces can be realized, e.g., by a fabric as material at least for the surface of the sliding bearing rings or by a coating. In addition to the geometric situation the elasticity of a soft layer compensates for or reduces the edge stress during tilting about the bearing axis.

As compared to cylindrical bushings, when internal tilting occurs (i.e., with a shaft tilting or shaft deflection) the edge stress is significantly lower in the proposed sliding bearing. The force flow is distributed over a larger contact area with correspondingly positive effects, for example, in the form of reduction of the peak stresses. A lower edge wear or a lower edge deformation, a slower increase in play, and a longer service life result therefrom.

In contrast to already-known bushings, the proposed sliding bearing can also support axial forces. Thrust washers (for example for centered guiding) can therefore be omitted.

Using the disclosed sliding surface geometry the inner ring centers itself with respect to the outer ring in a similar manner as with spherical plain bearings.

The design of the disclosed sliding bearing can be flexibly devised. Bearings are realizable that have very large installation widths in comparison to the bearing diameter. The basic load ratings are at a very high level, which is a result of a large surface contact area. The properties of the sliding bearing with respect to tilting-movability, moment stiffness, axial movability, and load carrying capacity are thereby customizable.

The design also makes it possible to replace conventional sliding bearings or bearing bushings with the disclosed sliding bearing. Due to the ability to transmit axial forces and to self-center, thrust washers can be omitted when the disclosed bearing is used.

The usability of the disclosed sliding bearing is largely without problems, since the user need no longer worry about sufficient shaft quality, as is the case with conventional bushing-shaft applications. Rather, it is a coordinated sliding-surface-counter-sliding-surface system. The shaft hardness or shaft-surface roughness are therefore not relevant to the sliding function. This offers a cost and functional advantage in comparison to already-known solutions.

In contrast to already-known spherical plain bearings, the proposed sliding bearing can also support a moment with greater tilting. Constructions of more tilt-stiff bearing assemblies including only one bearing are thus also possible.

In contrast to toroidal rolling-element bearings the proposed sliding bearing can also be used as the sole bearing.

Due to the axial movability a bearing assembly made from two inventive sliding bearings can be provided, which sliding bearings are both installed as fixed bearings. Length-expansion differences, for example, due to temperature differences between shaft and housing, can be compensated for by an extended axial clearance.

In the mentioned design having a very small profile radius in comparison to the bearing radius, the disclosed sliding bearing makes it possible to support higher tilting moments. This use is related to so-called slewing bearings in spherical or crossed roller designs.

In general, manufacturing and assembly methods as are known for plain bearings can also be used with the proposed sliding bearing, for example, one-side or two-side axially divided (broken) outer rings or even also, for example, radially divided outer rings.

The sliding surfaces can be provided with different coatings that may be maintenance-free depending on the application. Furthermore, lubrication bores can also be provided in the proposed sliding bearing. Finally, integrated seals can also be provided and/or any suitable materials can be used for the bearing rings.

Depending on the embodiment a realization with radial clearance and axial clearance can also be provided with the disclosed sliding bearings, as is also the case with spherical plain bearings.

BRIEF DESCRIPTION OF THE DRAWINGS

Exemplary embodiments of the disclosure are illustrated in the drawings.

DETAILED DESCRIPTION

Figure 1:
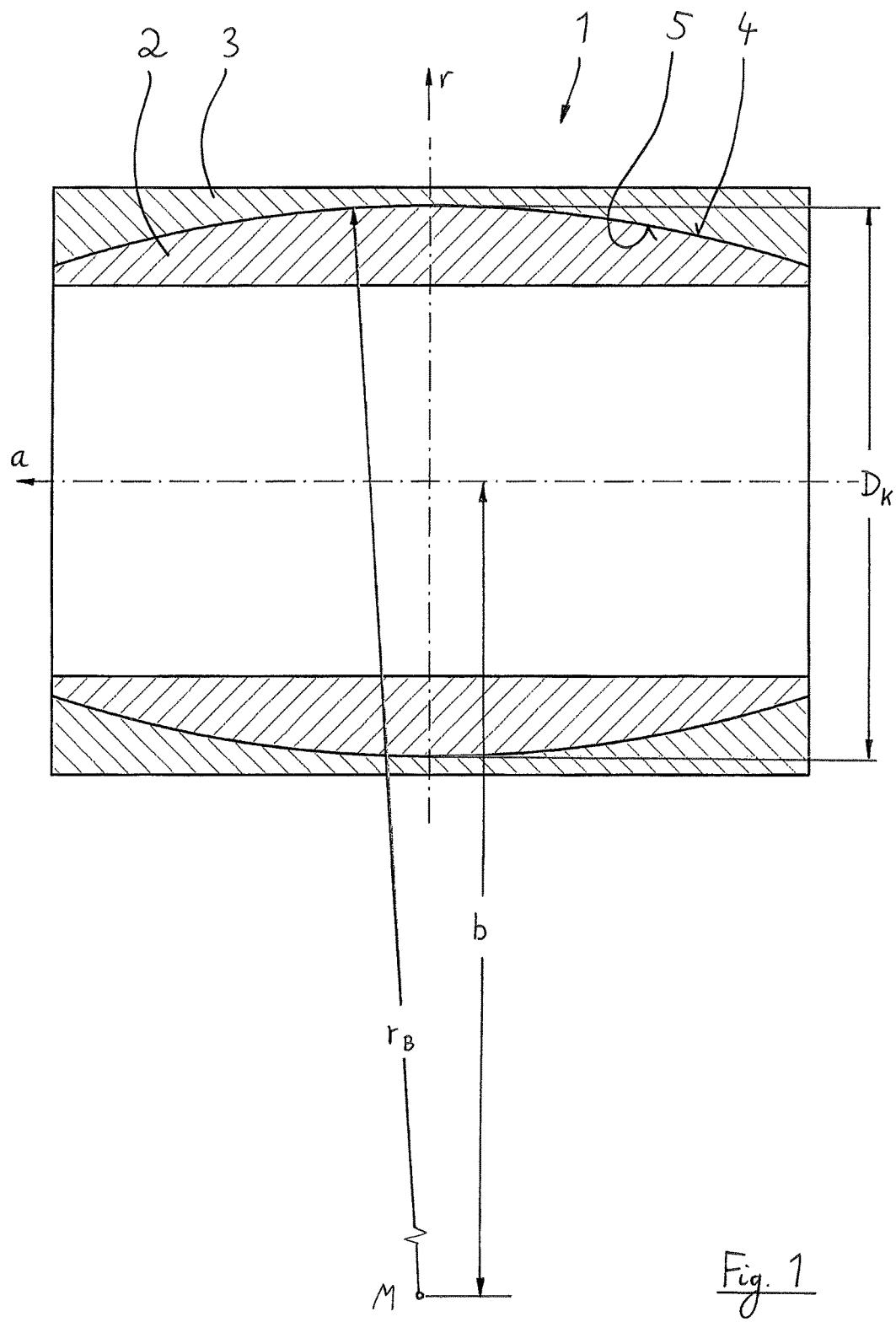
FIG. 1 shows a radial section through a sliding bearing according to a first embodiment.

FIG. 1 shows a sliding bearing that includes a bearing inner ring 2 and a bearing outer ring 3. The bearing inner ring 2 has a sliding surface 4, and the bearing outer ring a sliding surface 5. The bearing inner ring 2 is configured to rotate about an axis a relative to the bearing outer ring 3, and the two sliding surfaces 4 and 5 slide against each other. It is preferred that the at least one inner ring has a radially inner surface that, when viewed in cross section, is formed by a single axially extending radial surface.

The mutually contacting sliding surfaces 4 and 5 form a contact surface that has a maximum contact diameter $D_K$. This contact diameter is measured in a radial direction r. From the radial section, it can be seen that the sliding surfaces 4, 5 have a (circular) arcuate shape that is characterized by the radius of curvature $r_B$.

It is essential to the invention that the radius of curvature $r_B$ has a centerpoint M that is offset by an amount b from the axis of rotation a, where the offset b is at least 5% of the radius of curvature $r_B$. It is preferred that an offset b of at least 50% of the radius of curvature $r_B$ is provided. In the exemplary embodiment according to FIG. 1 the distance b is at a distance from the rotational axis a of approximately 80% of the radius of curvature $r_B$ (b=0.8*$r_B$).

Furthermore, in the disclosed bearing—as in the exemplary embodiment according to FIG. 1—the radius of curvature $r_B$ may be at least 150% of the maximum contact diameter $D_K$.

In contrast to already-known bearings the centerpoint of the radius of curvature does not lie on the axis a, but (far) below it (in a conventional bearing, the radius of curvature $r_B$ would be 50% of the maximum contact diameter $D_K$). In the exemplary embodiment the radius of curvature $r_B$ is approximately 200 to 300% the maximum contact diameter $D_K$.

Figure 2:
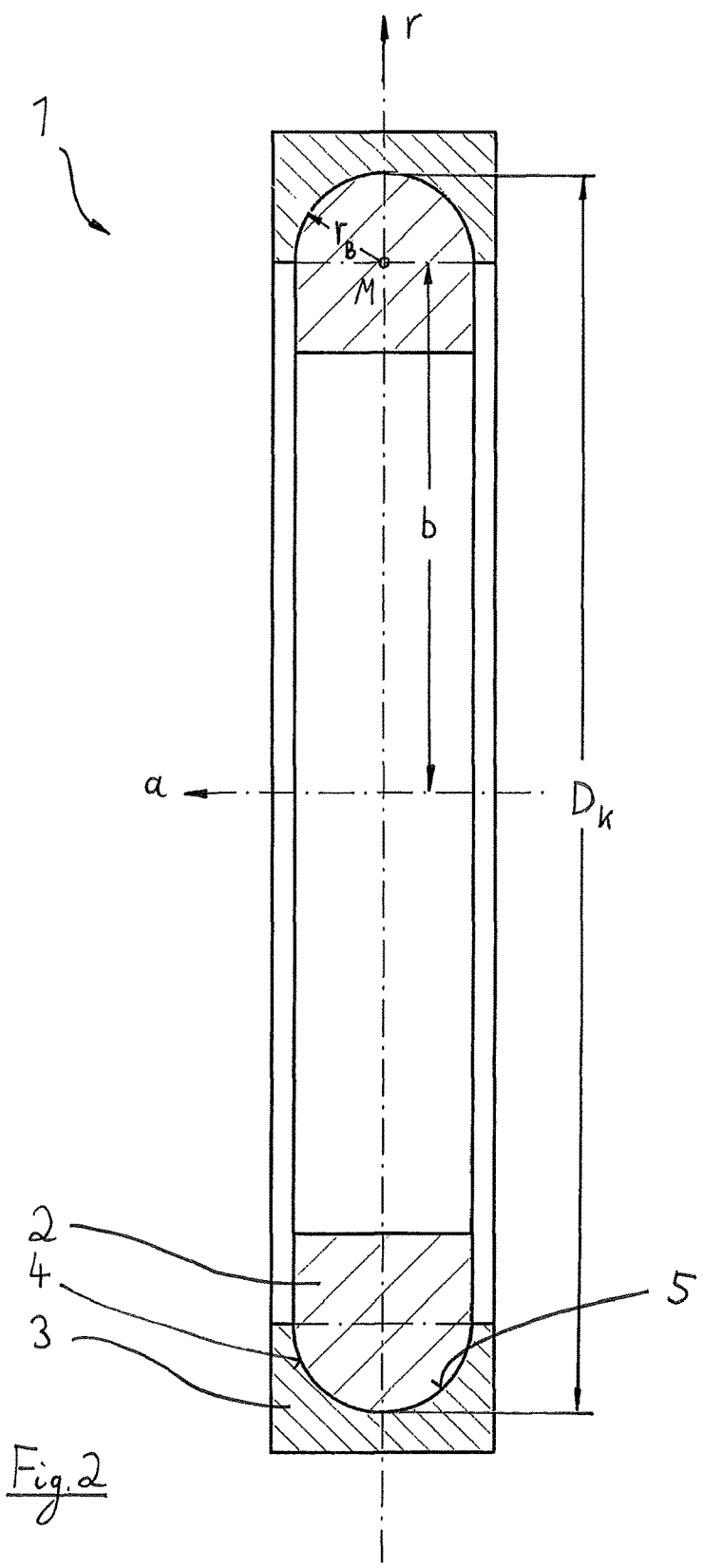
FIG. 2 shows a radial section through a sliding bearing according to a second embodiment.

In FIG. 2 a variant is depicted in which the geometric relationships are defined differently, namely the radius of curvature $r_B$ is very small in relation to the maximum contact diameter $D_K$. According to FIG. 2 the offset b from the centerpoint M to the axis a is approximately 600% of the radius of curvature $r_B$. In addition, the radius of curvature $r_B$ is approximately 7 to 8% of the maximum contact diameter $D_K$.

Figure 3:
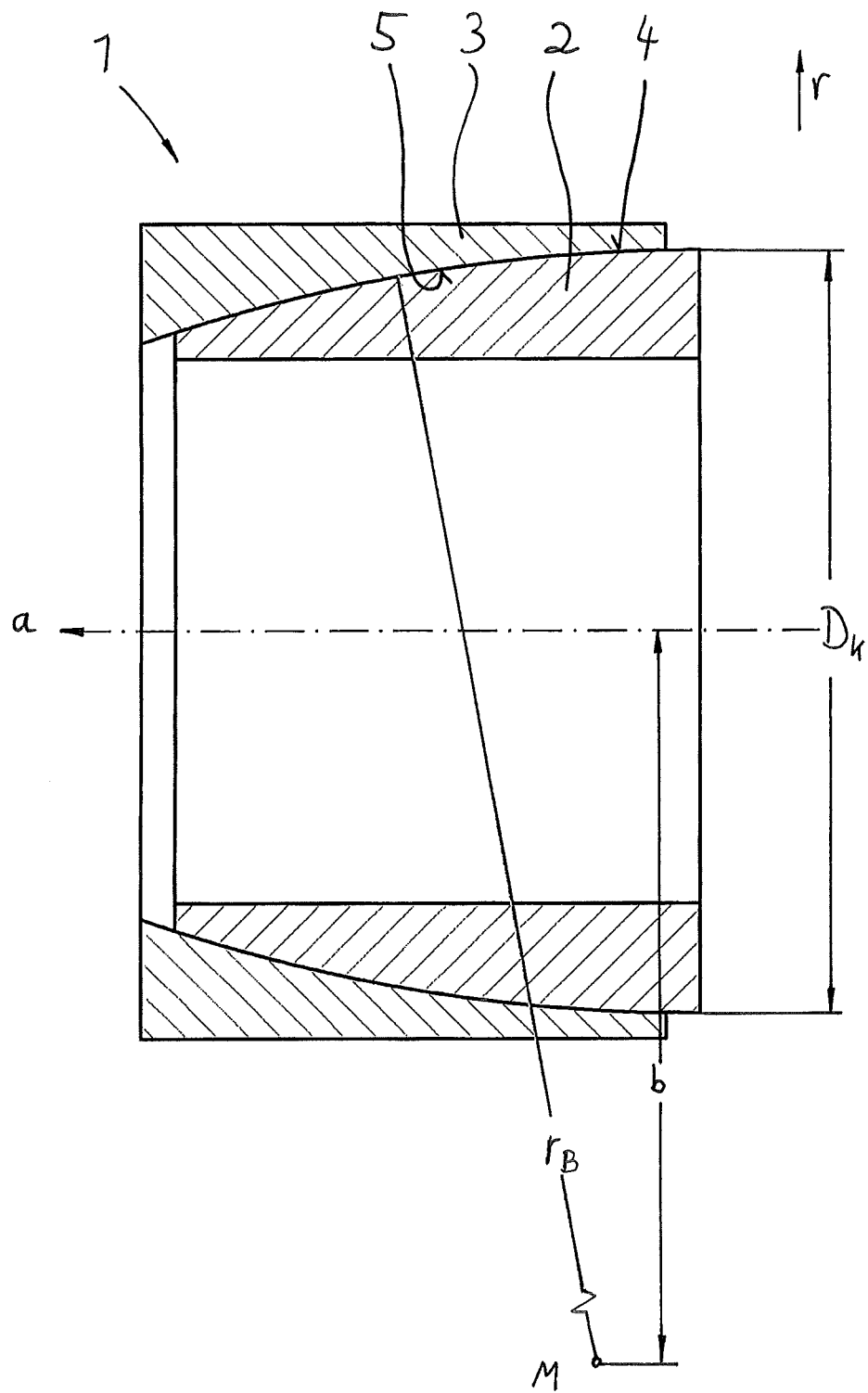
FIG. 3 shows an alternative design of the sliding bearing according to FIG. 1 in radial section.

In the variant according to FIG. 3 the bearing rings 2, 3 have no symmetry-forming center plane.

Figure 4:
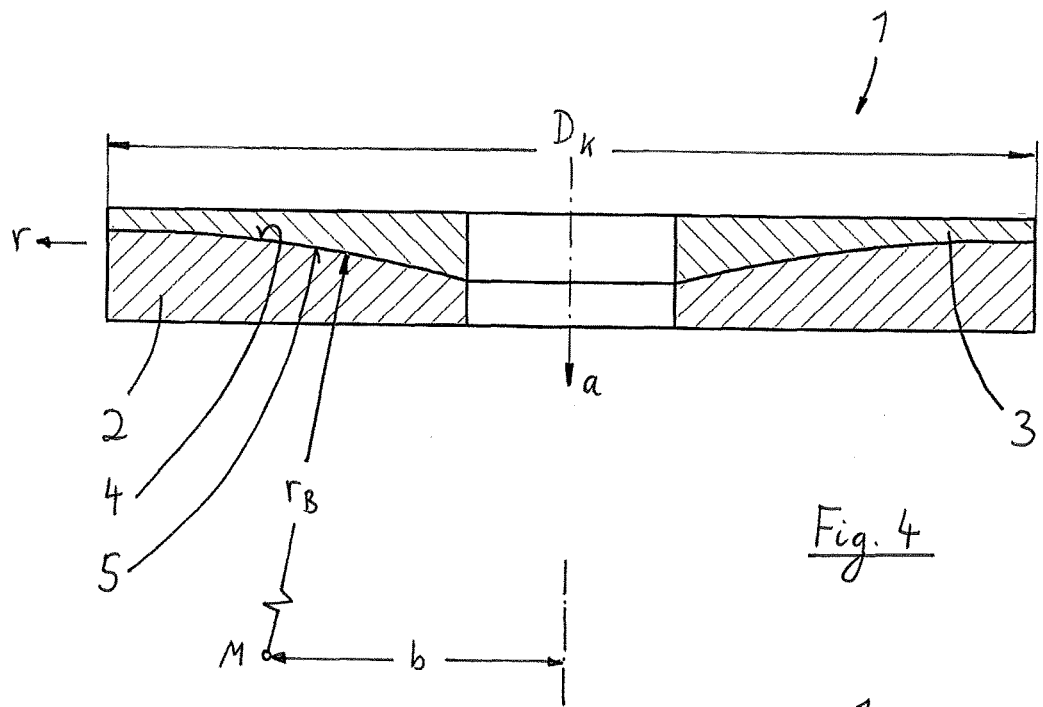
FIG. 4 shows a further alternative design of the sliding bearing in radial section.
Figure 5:
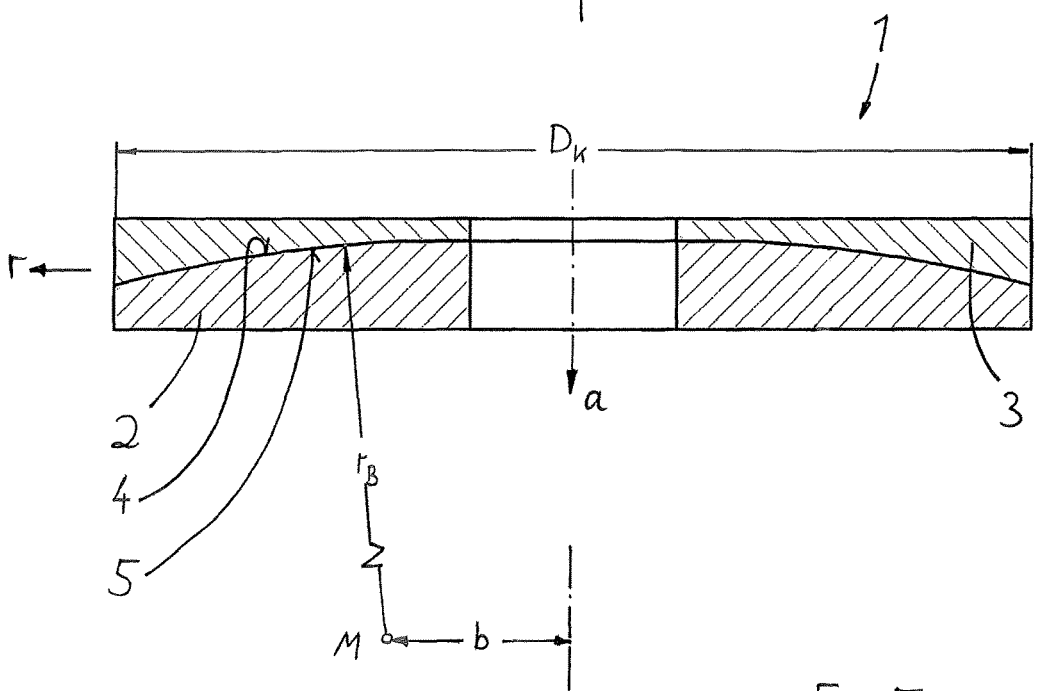
FIG. 5 shows a design similar to FIG. 4 of the sliding bearing in radial section.

In FIGS. 4 and 5 two embodiment variants are shown in which an axial bearing function is more important. This is based on the axis a and the radial direction r. Otherwise the above-described principle is also described here.

Figure 6:
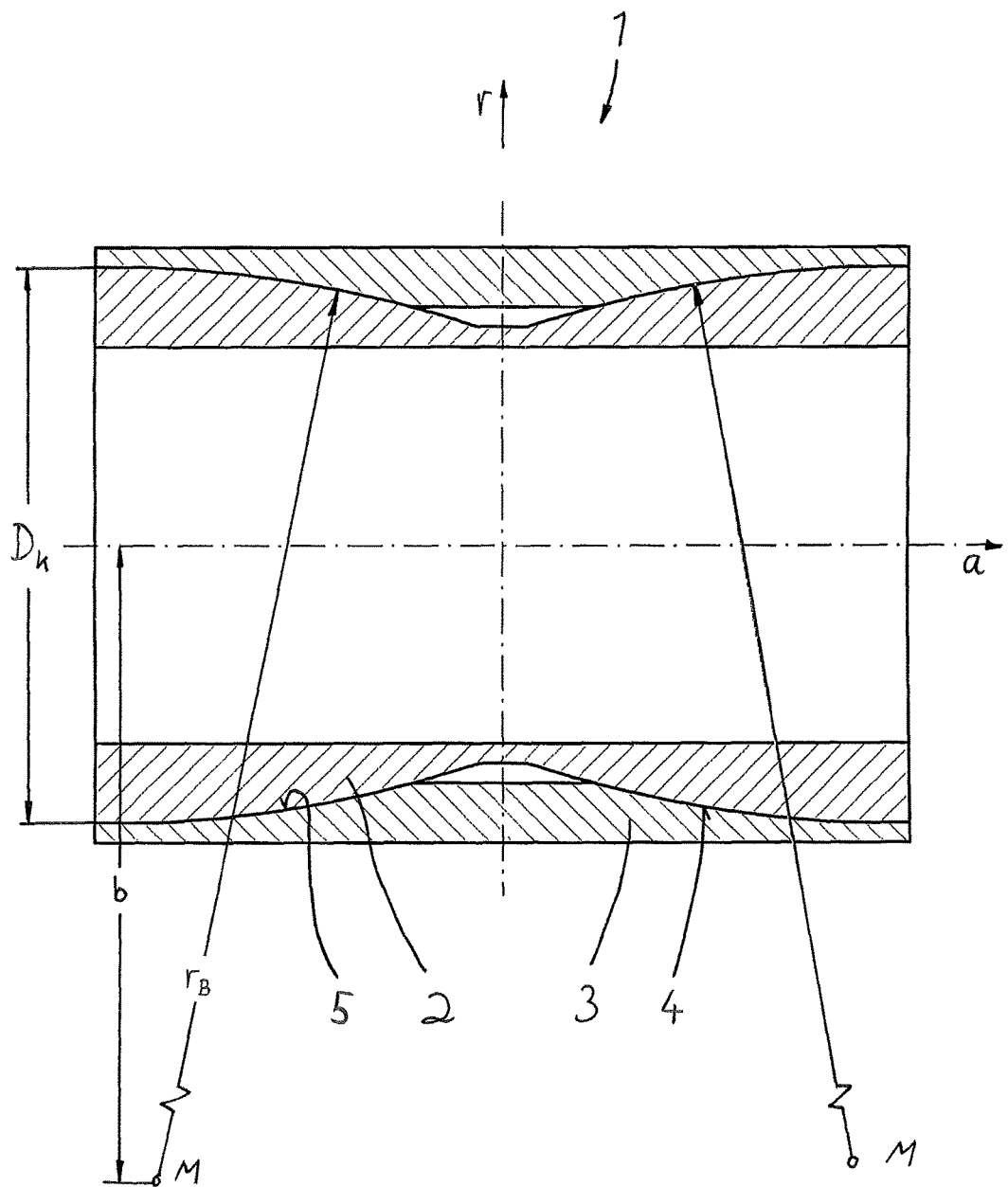
FIG. 6 shows a further alternative design of the sliding bearing in radial section.

In FIG. 6 two adjacent sliding bearing sections are realized wherein a common one-piece bearing inner ring 2 and a common one-piece bearing outer ring 3 are used. This is similar to a back-to-back arrangement of the exemplary embodiment according to FIG. 3 with a common one-piece inner ring and outer ring.

Figure 7:
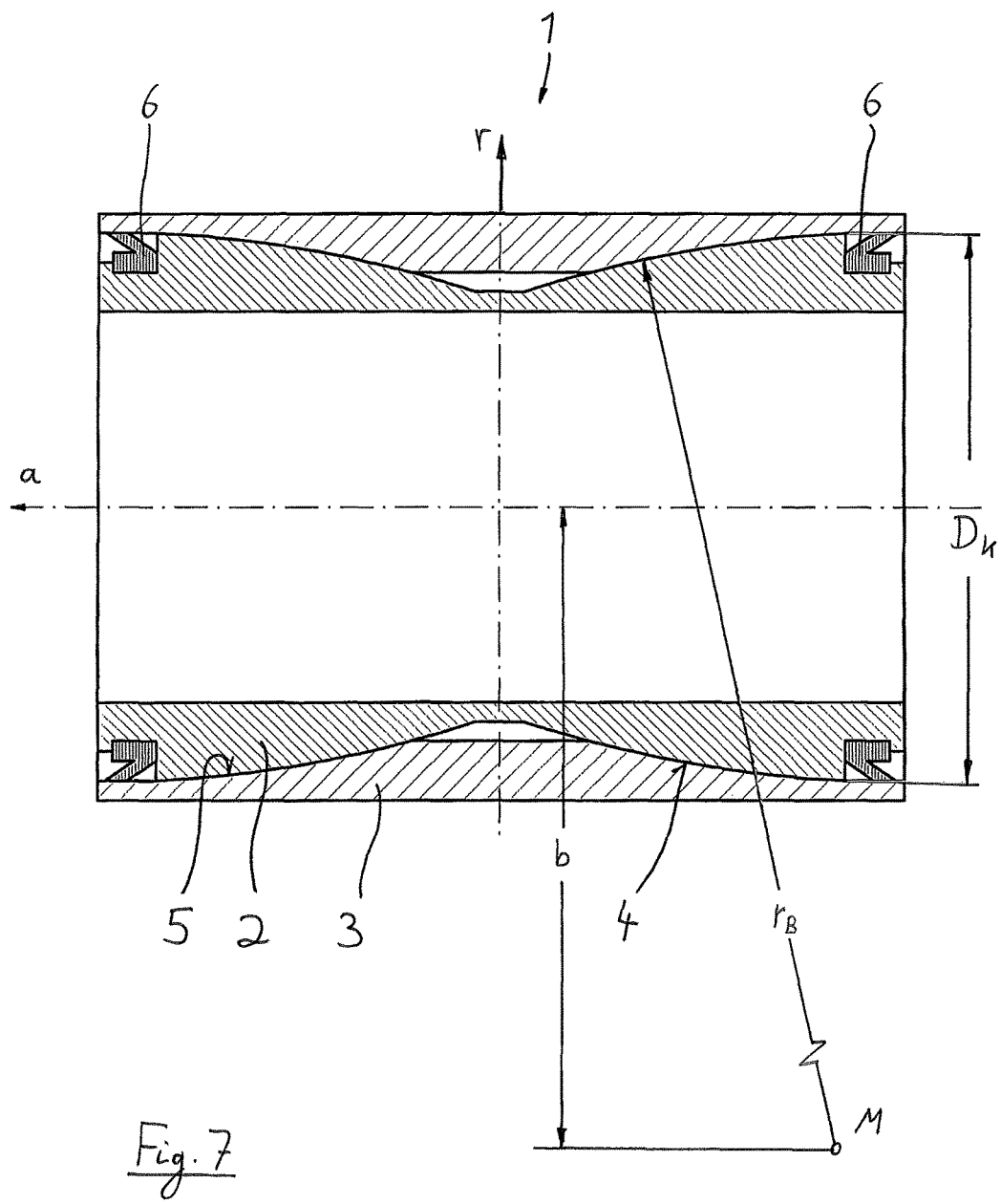
FIG. 7 shows a design of the sliding bearing similar to FIG. 6 in radial section.

In the exemplary embodiment according to FIG. 7, in addition to the solution according to FIG. 6, seals 6 are placed in each axial one-sided region, which seals 6 protect the sliding contact of the bearing rings.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved sliding bearings.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

REFERENCE NUMBER LIST

1 Sliding bearing
2 Bearing inner ring
3 Bearing outer ring
4 Sliding surface
5 Sliding surface
6 Seal
r Radial direction
a Axis
b Offset (distance of centerpoint M to axis a)
$D_K$ Maximum contact diameter
$r_B$ Radius of curvature (profile radius)
M Centerpoint of the radius of curvature

What is claimed is:

1. A sliding bearing having a first axial end and a second axial end, the sliding bearing comprising a common one-piece bearing inner ring and a common one-piece bearing outer ring configured to rotate relative to each other about an axis (a), wherein the common one piece bearing inner ring and the common one-piece bearing outer ring each include two sliding surfaces, which sliding surfaces are configured to slide along each other, wherein the sliding surfaces are formed by the mutually contacting sliding surfaces has a maximum contact diameter (DK) at the first and second axial ends, wherein the common one-piece inner ring has a radially inner surface that in cross section is formed by a single axially extending radial surface, wherein at least parts of the sliding surfaces in a radial section have an arcuate shape having a radius of curvature (rB), and wherein the radius of curvature (rB) has a centerpoint (M) located at an offset (b) from the axis (a), the offset (b) being at least 5% of the radius of curvature (rB), wherein the radius of curvature (rB) is from 150% to 600% of the maximum contact diameter (DK), the common one-piece inner ring and the common one-piece outer ring being out of contact along a portion of an axial bearing length that is spaced from the first and second axial ends.

2. The sliding bearing according to claim 1, wherein the offset (b) is at least 50% of the radius of curvature (rB).

3. The sliding bearing according to claim 1, wherein the radius of curvature (rB) is from 200% to 400% of the maximum contact diameter (DK).

4. The sliding bearing according to claim 1, wherein the common one-piece bearing inner ring comprises a shaft.

5. The sliding bearing according to claim 1, wherein the common one-piece bearing outer ring comprises a stationary machine part or housing.

6. The bearing according to claim 5, wherein an elastic material comprising a coating is applied to the common one-piece bearing inner ring and/or the common one-piece bearing outer ring.

7. The sliding bearing according to claim 1, wherein the common one-piece bearing inner ring and/or the common one-piece bearing outer ring is manufactured by 3-D printing.

* * * * *